Dec. 15, 1964   M. CORNEY ETAL   3,160,952
METHOD OF EXPLOSIVELY PLATING PARTICLES ON A PART
Filed March 26, 1962

INVENTOR.
MARTIN CORNEY
IRVING LIEBERMAN
LOUIS ZERNOW
BY
ATTORNEY 3,160,952
METHOD OF EXPLOSIVELY PLATING PARTICLES ON A PART
Martin Corney, Glendora, Irving Lieberman, Covina, and Louis Zernow, Glendora, Calif., assignors to Aerojet-General Corporation, Azusa, Calif., a corporation of Ohio
Filed Mar. 26, 1962, Ser. No. 182,552
16 Claims. (Cl. 29—529)

This invention relates generally to an improved apparatus for forming powdered material into a cohesive structure, and more particularly, to an apparatus for plating a work surface with a layer of powder-like material.

Heretofore, techniques have been developed for coating or plating a work surface with a difficult-to-plate material such as tungsten or powdered molybdenum by driving small particles of the material against the work surface at a very high velocity. The impact of the high velocity particles against the work surface caused the particles to adhere to the work surface so that after a period of time, the work surface was covered by the material.

These prior techniques, although useful for many purposes had certain undesirable limitations, in that they could not be used to coat the interior of cavities or bore holes which were inaccessible to the powder spraying mechanism, and they were not always satisfactory for plating certain kinds of irregular surfaces. In addition, the equipment required was complex and expensive and the plating operation was time consuming. Now, the need for more rapid and inexpensive techniques for plating work surfaces with difficult-to-plate material has sharply increased with the development of modern technology where there is an increasing requirement for metallic surfaces coated with hard-to-plate materials, such as tungsten or powdered molybdenum.

What is needed, theerfore, and comprises a principal object of this invention is to provide a rapid inexpensive method of plating material on a work surface which can be used on internal as well as external surfaces.

Another object of this invention is to provide a rapid method of plating a work surface with a layer of material having a controlled thickness.

A further object of this invention is to provide a method of plating a work surface with a plurality of layers of different kinds of material.

Another object of this invention is to provide a rapid method of forming a solid work piece entirely from powdered material.

The invention, in its broadest aspect, comprises covering a surface of a work piece which is to be plated, with a plating material in powdered form. The work piece with the plating material covering the surface to be plated is immersed in a shock wave transmitting medium. An explosion is caused to occur in the shock wave transmitting medium, producing a shock wave therein. This shock wave impacts on the coated surface of the work piece causing the plating material to bond together and to the work surface in a cohesive fashion.

This and other objects of this invention will become more apparent when read in the light of the accompanying specification and drawings, wherein.

Figure 1:
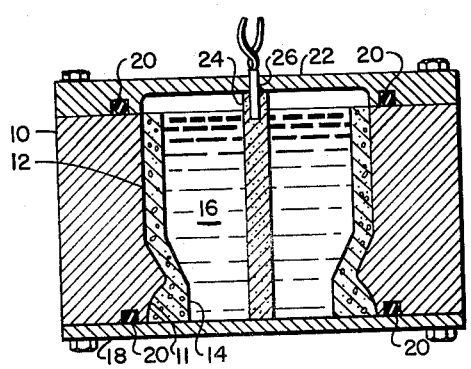
FIGURE 1 is a longitudinal sectional view showing a tubular work piece with an irregular inner surface to be plated, immersed in a shock wave transmitting medium with an explosive material.

Referring now to FIGURE 1 of the drawings, a work piece, indicated by the reference numeral 10, is tubular in shape and the bore 11 has an inner irregularly shaped surface 12 which is to be plated. This inner surface 12 is first covered by the plating material 14 while in a powder-like form. This plating material may be held in position on the surface 12 by use of chemical or mechanical binders in a manner well-known in the art. Alternatively, the plating material may be held in place by filling bore 11 with a generally solid or resilient shock wave transmitting medium or filler material, thus giving the shock wave transmitting medium a dual function, as will become apparent below.

In the embodiment shown, however, the shock wave transmitting medium filling the bore 11 is water 16. The water is retained in the bore 11 of work piece 10 by attaching a base plate 18 to one end of the work piece in a manner well-known in the art. To prevent leaking, an O-ring 20 may be positioned between the inner surface of the base plate and the end of the workpiece.

A cover plate 22 may be provided for covering the opposite end of the workpiece, both for confining the water to the interior of the workpiece and for supporting a chemical explosive 24 and igniter 26. An O-ring 20 may be positioned between the inner surface of the cover plate 22 and the end of the workpiece 10 opposite thereto to prevent leakage therebetween. With this arrangement, when the igniter is fired, explosive 24 detonates, producing a shock wave in the water 16. A sufficient quantity of explosive is used so that the impact of the resulting shock wave on the plating material 14 covering inner surface 12 is sufficient to cause the plating material to adhere to the workpiece with a firm bond in a cohesive homogeneous-like structure.

Figure 2:
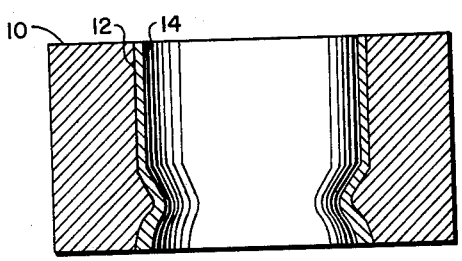
FIGURE 2 is a longitudinal sectional view showing the finished work piece with the powdered material plated on the inner irregular surface after the explosive material has been detonated.

After the explosive 24 has been detonated, the base plate 18 and the cover plate 22 are removed permitting the water to drain away and leave the workpiece 10 with inner surface 12 plated, as shown in FIGURE 2.

In the embodiments shown in the drawings, the shock waves in the shock wave transmitting medium have been produced by detonating an explosive material. It is, however, to be understood that the method of forming the shock wave is not critical and other techniques for producing a shock wave can be used. In particular, it is also contemplated that the shock wave can be produced by inserting a spark gap in the water and connecting the terminals of the spark gap to a voltage source powerful enough to produce sparks in the water, or a shock wave can be produced by passing a large current through a thin conductive film in the water to cause the film to explode.

Figure 3:
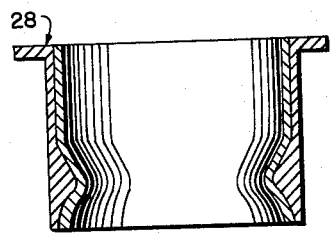
FIGURE 3 is a longitudinal sectional view showing a thin-walled tubular element with an explosively plated inner surface.

It is apparent that the above-described technique for explosively plating material on the surface of a workpiece can be employed for explosively plating the inner surface of a thin-walled part. This can be done in two ways. One way would be to insert the thin-walled part in a surrounding reinforcing structure so that the force of the shock wave in the shock wave transmitting medium will not deform the workpiece. Alternatively, a blank having sufficient strength to withstand the force of the explosion can be formed by first shaping the surface to be plated as desired. Next, the plating material is deposited on this surface in the manner described above. If, at this stage, FIGURE 2 represents a blank with the inner surface explosively plated as desired, a conventional machining operation can be applied to the external surface of the blank to form a final machined thin-walled product 28 having a plated inner surface (see FIGURE 3).

Figure 4:
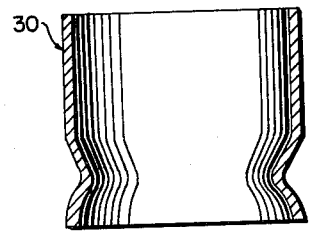
FIGURE 4 is a longitudinal sectional view showing an example of a tubular article formed entirely from powdered material using the explosive forming technique.

The above-described technique for explosively compacting or plating material on a surface can also be used to completely fabricate a thin-walled part from a hard-to-work-with material, such as powdered tungsten or molybdenum. As shown in FIGURE 4, this can be done by considering workpiece 10 as a die member and after material 14 has been plated on the die surface in sufficient thickness, the die can be removed from the compacted material 14 by any suitable technique such as dissolving it or machining it away. The end result will be a thin-walled member 30 having any desired thickness and formed entirely from the powdered compacted material 14.

Figure 5:
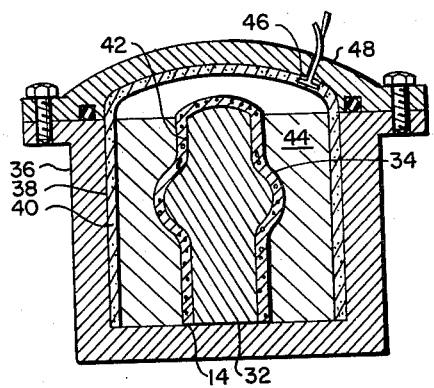
FIGURE 5 is a longitudinal sectional view showing the explosive plating technique used to plate an irregularly shaped external surface of a work piece.

As shown in FIGURE 5, the method of explosively compacting or plating material on a work surface can be applied to plating the irregular external surface of an article. As shown in FIGURE 5, a workpiece 32 having an irregularly shaped external surface 34 is mounted inside a container 36. The inner walls 38 of the container are covered with an explosive 40 in sheet form and the external surface 42 of workpiece 32 is covered by layers of a powdered plating material 14, as described in connection with FIGURE 1. The interior of the container 36 is filled with a shock wave transmitting material 44 which, in the embodiment shown, happens to be lead, although it is to be understood that other shock wave transmitting materials such as water, wax, rubber, plastic, or wood, could be used. An igniter 46 is connected to the explosive 40 so that when the igniter is actuated, the explosive material detonates, producing a shock wave in the lead. This shock wave traveling through the lead impacts against the external surface 42 of workpiece 32. This forces the plating material 14 against the external surface of the die to form a firm bond and a cohesive structure. As shown in the drawing, the detonator 46 is mounted in a cover plate 48 which has the function of preventing particles of metal from escaping from the container when the explosive is detonated.

Figure 6:
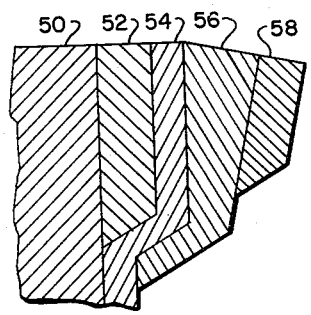
FIGURE 6 is a fragmentary longitudinal sectional view showing a portion of a work piece plated with a plurality of layers of different kinds of materials.

It is evident that this technique can be used repeatedly to build up on the surface of any workpiece a plating layer of any desired thickness. In addition, this technique of explosively plating material on the surface of the workpiece can be used to explosively plate a plurality of layers of dissimilar materials on a surface to form a plated laminate covering the surface of a workpiece. If desired, as described in connection with FIGURE 4, it is possible to form an article of manufacture composed entirely of a laminate of layers of compacted material forced together. In particular, as shown in FIGURE 6, the inner surface 50 of a workpiece is plated in four successive operations with dissimilar plating materials 52, 54, 56, and 58. It is noted that the thicknesses of these plating materials can vary as desired. Alternatively, the various layers of plating materials on surface 50 of the workpiece may be compacted together in a plated laminate by using only one detonation of sufficient strength.

It is to be understood that the form of the invention herewith shown and described is to be taken as a preferred example of the same, and that various changes in the shape, size, and arrangement of the parts may be resorted to without departing from the spirit of this invention or the scope of the claims.

We claim:

1. A method of plating materials on a workpiece comprising the steps of covering the surface of the workpiece to be plated with a plurality of individual particles of plating material, inserting at least the surface of the workpiece with the particles of plating material thereon in a shock wave transmitting medium, inserting means for creating an explosion in said shock wave transmitting medium, and using said means to cause an explosive shock wave in said shock wave transmitting medium whereby the impact of the shock wave on the particles of plating material over the surface of the workpiece to be plated is with sufficient force to cause the particles of plating material to become adhered to each other and to the workpiece with a firm bond and cohesive structure.

2. A method of plating materials on a workpiece comprising the steps of covering the surface of the workpiece to be plated with a plurality of individual particles of plating material, inserting at least the surface of the workpiece with the particles of plating material thereon in a dual purpose medium, said medium serving to hold the particles of plating material on said workpiece and serving as a shock wave transmitting agent, providing an explosive shock transmitted through said medium to the particles of plating material over the surface of the workpiece of sufficient force to cause the particles of plating material to become adhered to each other and to the workpiece with a firm bond and cohesive structure.

3. The method described in claim 2 wherein said dual purpose medium is molten lead.

4. The method described in claim 2 wherein said dual purpose medium is plastic.

5. The method described in claim 2 wherein said dual purpose medium is rubber.

6. The method described in claim 2 wherein said dual purpose medium is wax.

7. A method of plating hard-to-apply materials on the surface of a bore in a work piece comprising the steps of covering the surface of the work piece to be plated with a plurality of individual particles of plating material, filling the bore with a shock wave transmitting medium, inserting means for creating an explosion in said shock wave transmitting medium in such a way that the explosion produces a shock wave in the medium, whereby the impact of the shock wave on the particles of plating material on the surface of the bore in the work piece is with sufficient force to cause the particles of plating material to become adhered to each other and to the work piece with a firm bond and cohesive structure.

8. The method described in claim 7 wherein the means for creating the explosion is by a chemical explosive.

9. The method described in claim 7 wherein said shock wave transmitting medium is water, and said means for creating a shock wave in the water is by inserting a spark gap in the water and connecting the terminals of the spark gap to a voltage source powerful enough to cause a spark to occur.

10. The method described in claim 7 wherein the shock wave transmitting medium is water, and the means for creating a shock wave in the water is by inserting a thin film of electrically conductive material in the water and connecting the thin film to a high voltage source to explode the film.

11. A method of plating a plurality of layers of different materials on a work piece comprising the steps of covering the surface of the work piece to be plated with the varying layers of dissimilar materials, inserting at least the surface of the work piece with the layers of materials thereon in a shock wave transmitting medium, inserting means for creating an explosion in said shock wave transmitting medium, and using said means to cause an explosive shock wave in said shock wave transmitting medium, whereby the impact of the shock wave on the layers of plating material over the surface of the work piece to be plated is with sufficient force to cause the layers of plating materials to adhere to the work piece with a firm bond and a cohesive structure.

12. A method as defined in claim 11, wherein each of the layers of different materials comprises a plurality of individual particles prior to the impact of the shock wave thereagainst.

13. A method of fabricating a thin-walled machined part with a hard-to-apply material comprising the steps of obtaining a blank, forming the surface of the blank to be plated to the proper shape, covering the shaped surface of the blank with a plating material, inserting at least the shaped surface with the plating material thereon in a shock wave transmitting medium, inserting means for creating an explosion in said shock wave transmitting medium, and using said means to cause an explosive shock wave in said shock wave transmitting medium, whereby the impact of the shock wave on the plating material over the shaped surface of the work piece is with sufficient force to cause the plating material to adhere to the surface of the blank with a firm bond and cohesive structure, and then removing a sufficient quantity of the material of the blank until the walls of the blank are sufficiently thin.

14. A method as defined in claim 13, wherein the plating material comprises a plurality of individual particles prior to the impact of the shock wave thereagainst.

15. A method of fabricating an irregularly shaped structure comprising the steps of forming a die surface having the desired shape, covering the surface of the die with a plurality of material particles, inserting at least the surface of the die with the particles of material thereon in a shock wave transmitting medium, inserting means for creating an explosion in said shock wave transmitting medium, and using said means to cause an explosive shock wave in said shock wave transmitting medium whereby the impact of the shock wave on the particles of material over the surface of the die is with sufficient force to cause the particles of material to adhere together with a firm bond forming a cohesive structure, and then removing the die from the cohesive structure formed from the particles of material.

16. A method of plating a work piece comprising the steps of covering a surface of the work piece to be plated with a plurality of individual particles of plating material, inserting at least the surface of the work piece with the particles of plating material thereon in a shock wave transmitting medium, and impacting the particles of plating material to cause the particles of plating material to adhere to each other and to the surface of the work piece with a firm bond to form a cohesive structure by creating an explosive shock in the shock wave transmitting medium to form a shock wave directed against the surface of the work piece covered by the particles of plating material.

References Cited in the file of this patent

UNITED STATES PATENTS

| 2,648,125 | McKenna et al. | Aug. 11, 1953 |
| 2,703,297 | MacLeod | Mar. 1, 1955 |
| 3,031,746 | Ciarlegio et al. | May 1, 1962 |
| 3,036,374 | Williams | May 29, 1962 |

FOREIGN PATENTS

| 766,741 | Great Britain | Jan. 23, 1957 |

OTHER REFERENCES

Pages 99–101, Space Aeronautics, February 1960.